United States Patent [19]

Satoh

[11] Patent Number: 4,823,608

[45] Date of Patent: Apr. 25, 1989

[54] METHOD OF MEASURING RESIDUAL STRESS IN A CARRIER PRODUCED IN MANUFACTURING OF A BELT FOR CONTINUOUSLY VARIABLE TRANSMISSION

[75] Inventor: Keiji Satoh, Tokyo, Japan

[73] Assignee: Fuji Jukogyo Kabushiki Kaisha, Tokyo, Japan

[21] Appl. No.: 168,184

[22] Filed: Mar. 15, 1988

[30] Foreign Application Priority Data

Mar. 20, 1987 [JP] Japan ................................. 62-067407

[51] Int. Cl.$^4$ ............................................. G01N 19/06
[52] U.S. Cl. ...................................................... 73/783
[58] Field of Search .............. 73/783, 785, 866, 865.8, 73/849

[56] References Cited

FOREIGN PATENT DOCUMENTS 53-42172 4/1978 Japan .

OTHER PUBLICATIONS

Williams et al., "The Determination of Residual Stresses in Plastic Pipe and Their Role in Fracture", Polymer Engineering and Science, Sep. 1981, vol. 21, No. 13.

Primary Examiner—Michael J. Tokar
Assistant Examiner—Robert R. Raevis
Attorney, Agent, or Firm—Martin A. Farber

[57] ABSTRACT

An endless metal carrier is bent and treated by a heat treatment process to provide residual stress. The product carrier is cut at a portion, and the radius of the cut carrier in the free state is compared with a standard radius of a standard carrier having a predetermined residual stress to determine whether the radius coincides with the standard radius.

4 Claims, 3 Drawing Sheets

METHOD OF MEASURING RESIDUAL STRESS IN A CARRIER PRODUCED IN MANUFACTURING OF A BELT FOR CONTINUOUSLY VARIABLE TRANSMISSION

BACKGROUND OF THE INVENTION

The present invention relates to a method for measuring residual stress in a carrier produced in manufacturing of a belt for a continuously variable belt-drive transmission for a motor vehicle.

A known continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions.

The belt comprises a pair of endless carriers and a plurality of metal elements adjacently arranged on the endless carriers, engaging opposed slits of each elements with the carriers. Each carrier comprises a plurality of laminated metal strips.

The carriers are repeatedly bent and straightened as they pass around the pulleys and the straight running sides, so that stresses are produced in the carriers. If the stress exceeds a fatigue limit, the belt may break down by repeated stress. Thus, the service life of the belt becomes short. Japanese Patent Laid Open No. 53-42172 discloses an endless metal carrier which is preliminarily bent to provide a residual stress (internal stress) in the carrier so that a maximum stress which is produced in the carrier during the operation may be below the fatigue limit. Accordingly, strength against repeated bending and straightening is improved.

However, the residual stress given in the carriers is not always constant. Accordingly, the maximum stress dependent on the residual stress may exceed the fatigue limit. Namely, the strength of the belt can not be sufficiently improved. Additionally, it is difficult to accurately measure the residual stress given in the carrier.

SUMMARY OF THE INVENTION

The object of the present invention is to provide a method of measuring residual stress in an endless metal carrier which may easily measure the residual stress provided in its manufacturing.

According to the present invention, there is provided a method of measuring residual stress in a carrier of a belt for continuously variable transmission, comprising the steps of bending an endless metal carrier, heat treating the bent carrier, cutting the hardened carrier, measuring the radius of the cut carrier at a portion, comparing the measured radius with a standard radius of a standard carrier which has a predetermined residual stress, and determining whether the measured radius coincides with the standard radius.

In an aspect of the invention, the predetermined residual stress is such that the sum of the moments of the residual stress in the carrier becomes zero at a posture where lines indicating an outer surface maximum stress and an inner surface maximum stress of the carrier coincide with each other.

The other objects and features of this invention will become understood from the following description with reference to the accompanying drawings.

DETAILED DESCRIPTION OF THE PREFERRED EMBODIMENT

Figure 1:
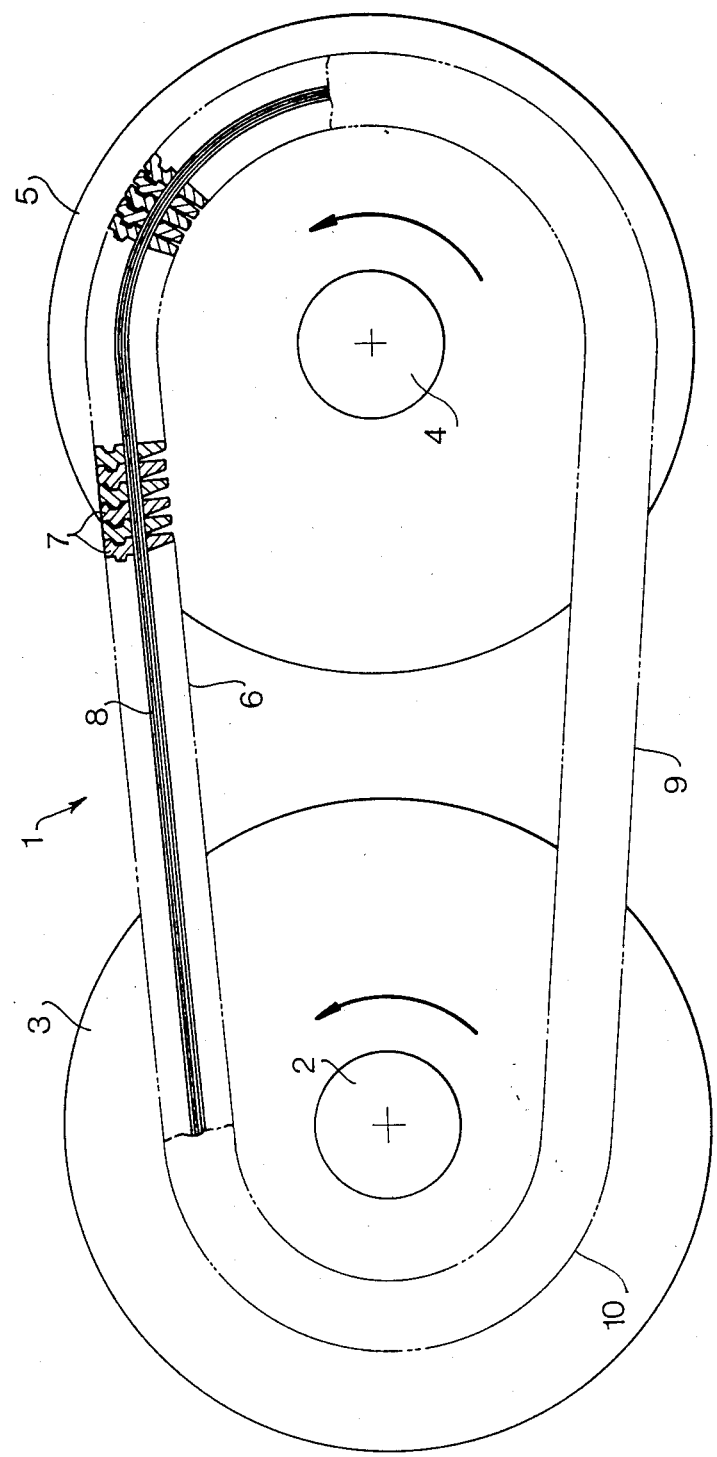
FIG. 1 is an elevational view of a belt device.
Figure 2:
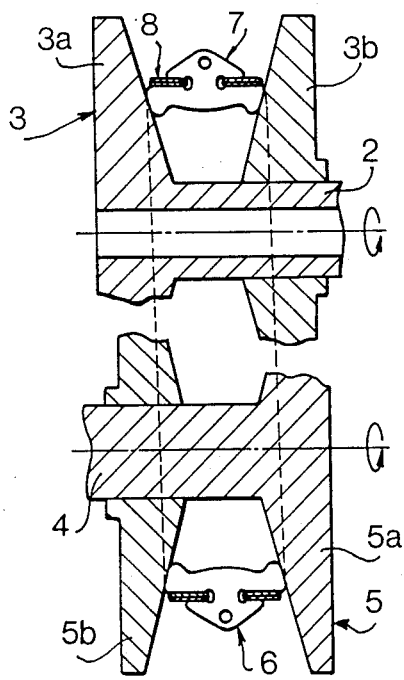
FIG. 2 is a schematic cross section of the belt device of FIG. 1.
Figure 3:
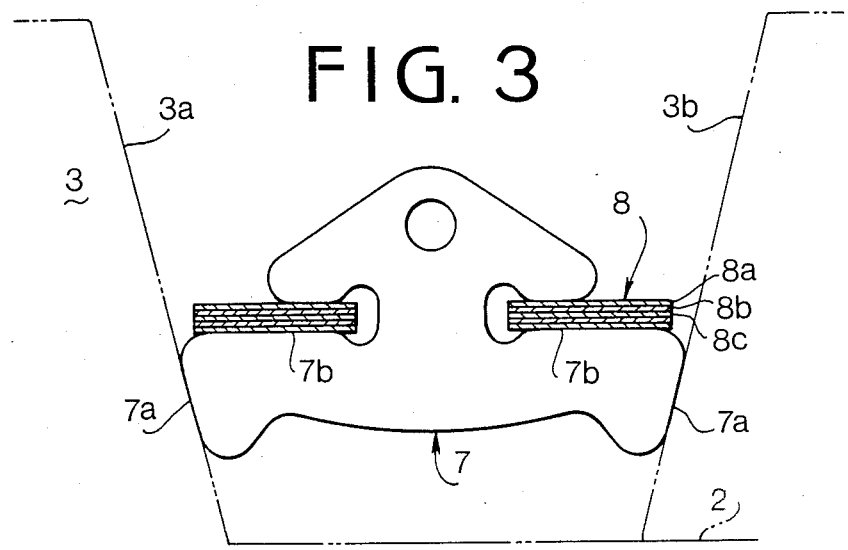
FIG. 3 is an elevational view of an element and carriers of a belt.

Referring to FIGS. 1 to 3, a belt-device 1 to which the present invention is applied, has an input shaft 2 and an output shaft 4 provided in parallel with the input shaft 2. A drive pulley 3 and a driven pulley 5 are mounted on the shafts 2 and 4 respectively. A fixed conical disc $3a$ of the drive pulley 3 is integral with the input shaft 2 and an axially movable conical disc $3b$ is axially slidably mounted on the input shaft 2. A conical face of the fixed conical disc $3a$ confronts a conical face of the movable conical disc $3b$ thereby forming a groove therebetween.

A fixed conical disc $5a$ of the driven pulley 5 is formed on the output shaft 4 opposite a movable conical disc $5b$. Conical faces of the respective discs $5a$ and $5b$ form a groove. A belt 6 engages the drive pulley 3 and the driven pulley 5.

The belt 6 comprises a pair of endless metal carriers 8 and a plurality of V-shaped metal elements 7 adjacently arranged along the carriers. Each element 7 has a pair of horizontal slits $7b$ at both sides wherein the metal carriers 8 are inserted.

The carrier 8 comprises laminated layers of flexible thin metal strips $8a$, $8b$, $8c$ . . . Each element 7 forms inclinations $7a$ at both sides of its lower portion so as to frictionally engage with the conical faces of discs $3a$, $3b$, $5a$ and $5b$ as shown in FIG. 3.

The engine power is transmitted from the input shaft 2 to the output shaft 4 through the drive pulley 3, belt 6 and driven pulley 5. As the movable conical discs $3b$ and $5b$ are axially moved along the shafts 2 and 4, the transmission ratio is continuously changed.

The belt 6 is repeatedly bent as it passes arcuate portions 10 along the pulleys and straightened at straight running sides 9 between the pulleys. Each carrier 8 is preliminarily bent to have a predetermined residual stress so as to be able to cope with such bending and straightening.

Figure 4:
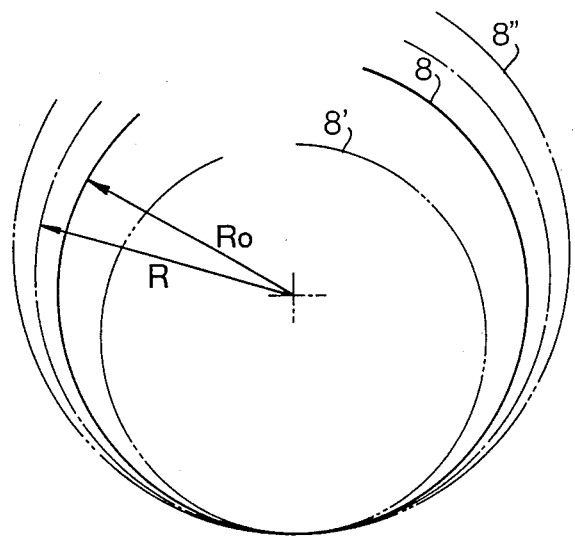
FIG. 4 is a diagram showing endless metal carriers in which residual stresses having different values are provided.

FIG. 4 shows carriers 8, each of which is cut at a portion. Each carrier forms an arc having a certain curvature where the sum of the moments of the residual stresses becomes zero. A radius $R_O$ of the arc varies as shown by chained lines 8' and 8" in dependency on the residual stress in the carrier 8.

Figure 5:
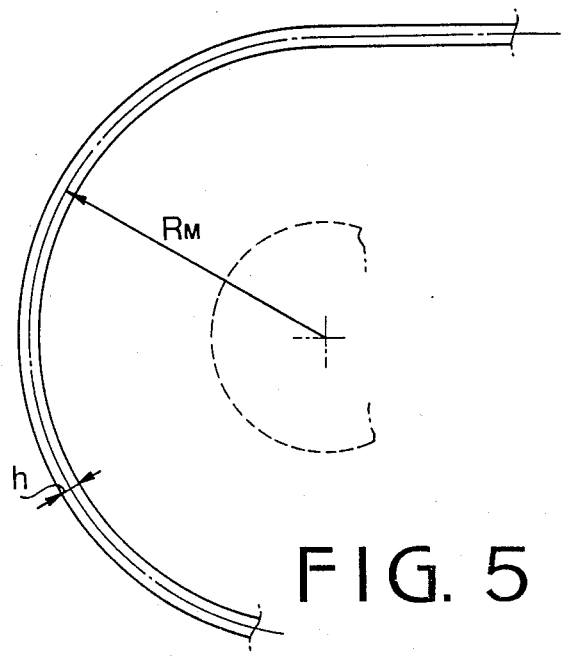
FIG. 5 is an enlarged view of a part of a belt and pulley device.

A maximum stress $\sigma$ inmax produced in the inner surface of the carrier and a maximum stress $\sigma$ outmax produced in the outer surface of the carrier can be represented as follows:

$$\sigma inmax = E \times h/(2R_O - h) \quad (1)$$

$$\sigma outmax = E \times h \times (R_O - R_M)/2R_O \times R_M \quad (2)$$

wherein $R_M$ is a minimum pitch radius of the carrier 8 running over the pulleys as shown in FIG. 5, h is the thickness of the carrier 8 and E is Young's modulus.

Figure 6:
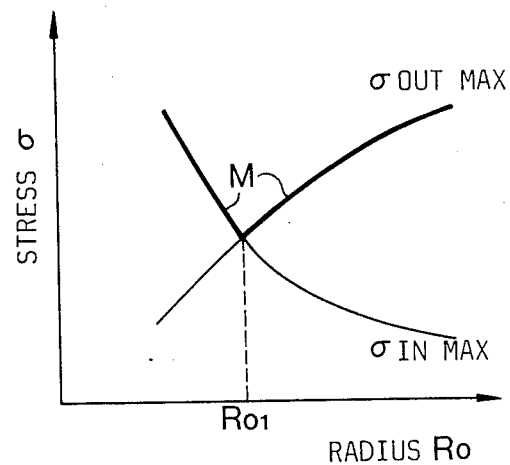
FIG. 6 is a graph showing a relationship between maximum stresses and radius of the arc of the carrier.

Since the thickness h and the minimum pitch radius $R_M$ are constant in a specific class of a belt drive transmission, the maximum stresses $\sigma inmax$ and $\sigma outmax$ change dependent on the radius $R_O$ which is dependent on the residual stress. FIG. 6 shows a relationship between the radius $R_O$ and maximum stresses $\sigma inmax$ and $\sigma outmax$ obtained by the equations (1) and (2), respectively. A bold line M in the graph indicates maximum stress produced in the carrier 8 as a whole.

As shown in the graph, when the radius $R_O$ is small, the maximum stress $\sigma inmax$ of the inner surface of the carrier 8 increases at the straight running sides 9 in the course of the belt 6. When the radius $R_O$ is large, the maximum stress of the outer surface of the carrier 8 increases at the arcuate portions 10. During the running of the belt, when the maximum stress acting on the carrier 8 increases, the strength of the carrier against the repeated bending stress decreases. Thus, in the described instances, the carrier 8 cracks either from the inner surface or from the outer surface as a result of fatigue.

On the other hand, the maximum stress in the carrier 8 as a whole becomes minimum when the outer surface maximum stress $\sigma outmax$ and inner surface maximum stress $\sigma inmax$ are equal to each other at a radius $R01$. Accordingly, it is desirable that a residual stress is provided in the carrier such that the sum of the moments of the residual stress in the carrier becomes zero at the radius ($R01$), where the lines indicating maximum stresses of the outer and inner surface intersect each other. Thus, the maximum stresses $\sigma outmax$ and $\sigma inmax$ can be reduced to a minimum value.

The residual stress can be provided in the carrier 8 by proper bending methods. For example, the endless metal carrier 8 is engaged with two tension rollers. A bending roller having a relatively small diameter is pressed against the carrier while it runs by the rotation of the tension rollers. Thereafter, the metal carrier is treated by heat treatment process including a solution treatment and aging However, it is difficult to produce a predetermined residual stress in a carrier in manufacturing thereof, and difficult to measure the residual stress in the carrier.

In accordance with the present invention, a sample of carrier selected from products is cut at a portion, in order to measure the residual stress. The cut carrier, when left free on a planar surface, forms an arc having a radius, for example a radius R as shown in FIG. 4 in dependency on its residual stress. The radius R is measured and compared with a standard radius $R_O$ of the carrier having a predetermined residual stress. If the difference between the radii exceeds a predetermined range, the previous standard magnitude of bending the carrier or heat treatment is adjusted in accordance with the difference. In manufacturing after the measurement, subsequent carriers are bent in accordance with the standard bending magnitude. Thus, a carrier having the predetermined residual stress can be manufactured. The residual stress can also be easily confirmed in the same manner at an inspection during the manufactured of the carrier.

From the foregoing, it will be understood that the present invention provides a method of easily measuring residual stress in a carrier.

While the presently preferred embodiment of the present invention has been shown and described, it is to be understood that this disclosure is for the purpose of illustration and that various changes and modifications may be made without departing from the scope of the invention as set forth in the apended claims.

What is claimed is:

1. A method of measuring residual stress in a heat-treated carrier of a belt for a continuously variable transmission, comprising the steps of:

bending an endless metal carrier at a predetermined radius;

applying heat treatment to the bent carrier;

cutting the heat-treated carrier at a portion;

measuring the radius of the cut carrier;

comparing the measured radius with a standard radius of a standard carrier so as to determine the difference between the radii, the standard carrier having a predetermined residual stress, the predetermined residual stress being such that the sum of the moments of the residual stress in the standard carrier is zero at a posture where an outer surface maximum stress and an inner surface maximum stress of the standard carrier coincide with each other; and determining whether the difference between the radii is within a predetermined range.

2. The method according to claim 1 wherein the posture has an arcuate form.

3. The method according to claim 1, wherein the carriers are formed of laminated layers of flexible thin metal strips.

4. The method according to claim 1, wherein the heat treatment step includes a solution treatment and aging.

* * * * *